June 18, 1940.   J. N. GONZÁLEZ   2,204,931
APPARATUS TO MECHANIZE THE CONJUGATION OF ENGLISH VERBS
Filed Aug. 25, 1937   2 Sheets-Sheet 1

June 18, 1940.   J. N. GONZÁLEZ   2,204,931
APPARATUS TO MECHANIZE THE CONJUGATION OF ENGLISH VERBS
Filed Aug. 25, 1937   2 Sheets-Sheet 2

Jose Nieto Gonzalez, Inventor

Patented June 18, 1940

2,204,931

UNITED STATES PATENT OFFICE 2,204,931

APPARATUS TO MECHANIZE THE CONJUGATION OF ENGLISH VERBS

José Nieto González, Salamanca, Mexico

Application August 25, 1937, Serial No. 160,912
In Mexico September 7, 1936

2 Claims. (Cl. 35—35)

This invention relates to a device of a very simple construction for mechanizing the conjugation of English verbs. It consists substantially of a matrix plate, an intermediate surface and several auxiliary additional plates; its main object being to facilitate the learning and practice of the conjugation of the verbs of the English language.

The features of the invention appear in the following description as well as in the drawings attached thereto, as an example of the way to practice the invention.

Figure 1:
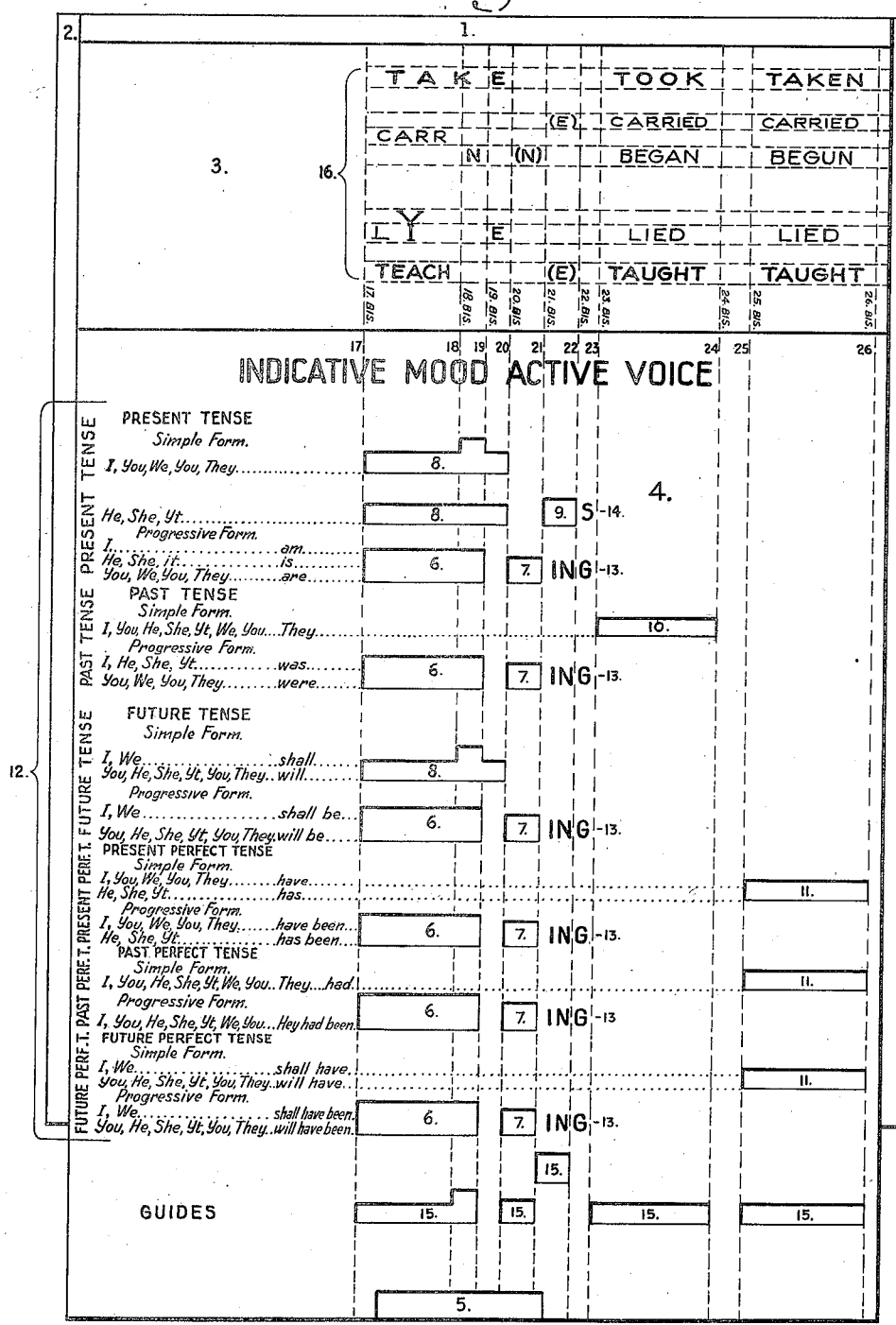
Fig. 1 shows the matrix plate, the intermediate surface and the auxiliary plate used for the conjugation of the active voice of the indicative mood.
Figure 2:
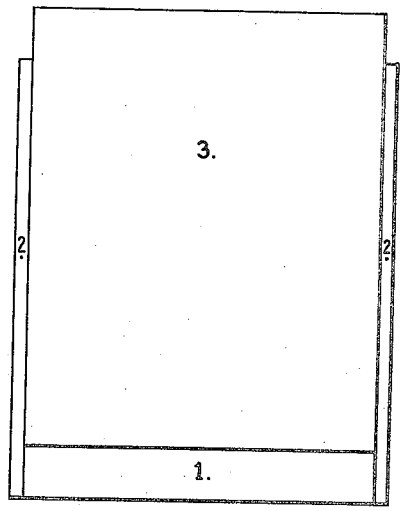
Fig. 2 shows the device according to the invention, formed by the matrix plate, and the intermediate surface.
Figure 3:
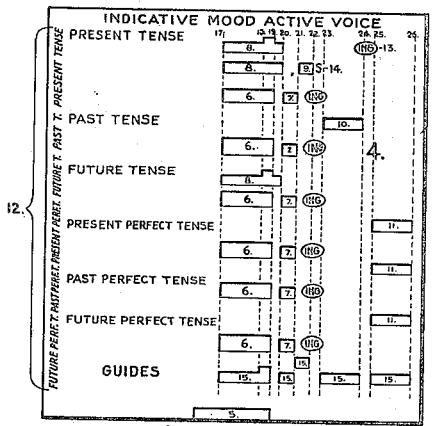
Fig. 3, 4, 5 and 6 show independent auxiliary plates used in connection with the device in the different conjugations of verbs.
Figure 4:
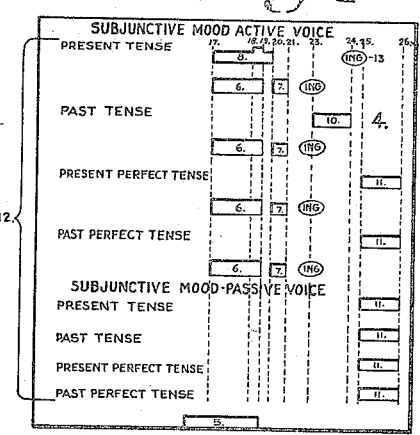
Figure 5:
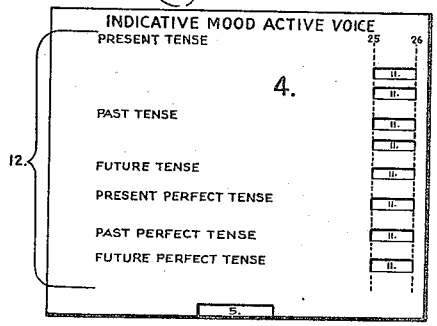
Figure 6:
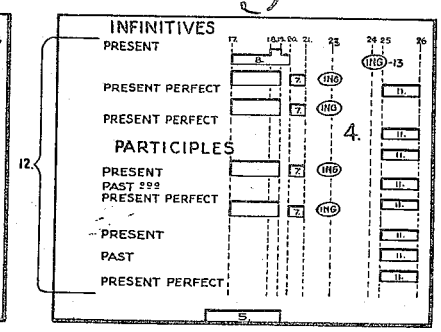

The invention comprises a matrix plate 1, the edges of which are formed with undercut guides 2. Arranged in the matrix plate is an intermediate undercut surface 3, bearing data to be later described, and auxiliary plates 4 slidable in the guides 2 overlying the intermediate surface 3 and are of themselves formed as later described for the purpose of conjugation of the verbs. The auxiliary plates are provided with handles 5, and are formed with large openings 6, short openings 7, large openings 8 for the present and future tenses of the verbs to be conjugated, short openings 9 for the present tense, and openings 10 for the preterit, and openings 11 for the past participle form. The auxiliary plates are marked with indications for persons and auxiliaries of the verbal mood indicated at 12, and with endings 13, there being further provided endings 14 for the third person in singular of the present or indicative. 15 indicates day openings, and the verbs to be conjugated are indicated at 16.

The dotted lines 17 to 26 inclusive, indicate imaginary lines drawn, to mark different parts of the openings when these are displaced on sliding the auxiliary plate between the two guides 2 in its matrix.

Dotted lines 17 bis to 26 bis inclusive, indicate imaginary lines projected on the intermediate surface as continuations of lines 17 to 26 inclusive.

The matrix 1 is a plate of rectangular shape along each one of the longer sides of which there is an undercut margin serving as guides.

Auxiliary plates 4 are formed with suitable openings, and will slide between the guides 2 of the matrix plate 1. These plates are formed in the upper part with designation of each one of the verbal moods that can be conjugated with the particular auxiliary plate 4. At the left of each one of said plates there are arranged, in blank spaced lines, the persons, auxiliary verbs and corresponding signs for each form of each one of the different tenses of the verbal moods, expressing in each tense and form the form and tense referred to. As the aforesaid verbal forms are thus incomplete, as there is lacking the word of the principal verb which must complete them, instead of said word and in the place to be occupied by it, that is to say, following the lines formed by the verbal persons or by them and the auxiliaries, there are located some openings followed, when it is necessary, by verbal endings.

It must be explained here that to use this device it is necessary that before hand there are printed or otherwise provided on the intermediate surface 3 the words that are the three fundamental forms of the English verb to be conjugated. It is necessary and desirable to have on the intermediate surface 3, the necessary additional letter for the conjugation of some verb. With the auxiliary letters applied, and upon sliding the auxiliary plate 4 between the two sliders 2 of the matrix plate 1, there will appear through the openings of the said auxiliary plate 4 the necessary letters of the words which constitute the three fundamental forms of the English verbs and of the additional letters written on the intermediate surface 3, so that in simple tenses and compound tenses and the verbal endings in the auxiliary plate, there is formed the word of the main verb which correctly completes the form of each tense in all verbal moods.

For a better understanding of the location and different shapes and sizes of the openings in the auxiliary plates 4, recourse has been had to imaginary parallels, shown in the drawings with dotted lines, which dotted line indications would be formed by several parts of the said openings on movement of the auxiliary plates 4, between the sliders 2 of the matrix 1; numbering these parallels according to the order in which they would be located from left to right such lines are indicated as follows: number 17 formed by the displacement of the left limits of the large openings of present, future and gerund: number 18 formed by the displacement of the left limits of the projections that in their upper part have some of the openings of present and future; number 19, formed by the displacement of the right limits of the aforesaid projections, as well as by the right limits of the large openings of gerund; 20 formed by the displacement of the right limits of the large openings of present and future as well as by the left limits of the short openings of gerund; 21 the line formed by the displacement of the right limits of the aforesaid short openings of gerund as well as by the left limit of the short opening of present; 22 is the imaginary line formed by the displacement of the right limit of the short opening of present. The line 23 is formed by the displacement of the left limits of the preterit openings. The line 24 formed by the displacement of the right limits of the said preterit openings; the line 25 is the line formed by the displacement of the left limits of the past participle openings; and the line 26 results formed by the displacement of the right limits of the said past participle openings.

The distance between the aforesaid lines 17 and 19 is sufficient so that in the space between them the fundamental word of present of any of the English verb may be written. Between the subsequent lines, there will be a sufficient space so that in the comprised space a letter can be written; that is, between the lines 18 and 19, 19 and 20, 20 and 21 and between the lines 21 and 22. Between lines 22 and 23 there is a space sufficient to separate two words. Lines 23 and 24 are at such distance from each other that the fundamental word of preterit can be written between them of any of the English verbs. Between lines 24 and 25 there is the distance sufficient to separate two words, and between the lines 25 and 26 there is space enough to write the fundamental word of the past participle of any of the English verbs.

In all the large and short openings of gerund and in all those openings in the auxiliary plate 4 in which the letters with the ending "ing" will occur, the longer are located at the left of the shorter and in that order all of them, one under the other, that is the long under the long and the short under the short, but always each one in front of the verbal form to which it corresponds. The long gerund openings are limited to the left by imaginary line 17 and to the right by the parallel 19, its width being sufficient that through them could be seen complete in height the letters of the fundamental word of present of any of the verbs to be conjugated, including the final "y" of the verbs that, ending in that letter, change it to "i" in some of its forms and including also the auxiliary lines which convert into "y" the "i" of some verbs like die and lie which change that "i" in "y" in some of their forms; the size and location to which the letter of this device must be adjusted will be explained on describing the intermediate surface 3.

The gerund short openings are limited to the left by the imaginary parallel 20 and to the right by number 21; the width sufficient to render visible one of the letters of those which are changed with letters of the fundamental word of present of the verb to conjugated and with the ending "ing" which in the auxiliary plates is to the right of these short openings.

The openings of simple forms of present and future are located, as all others, each one in front of persons or signs of the corresponding form; the short, when such exist, located to the right of the long ones. The left limit of the long openings of present and future are formed by the imaginary parallel 17 and the right limit by the parallel 20; its width is sufficient to visibly complete in their height the letters of the fundamental word of the present of the verbs to be conjugated, excepting the auxiliary lines which convert in "y" the "i" of those verbs that like die and lie change said letter for the other in some of their forms. The long openings in this group which is following the line formed by the three persons of singular in the simple form, present tense, indicative mood, active voice, maintain an equal width in all its length and therefore there could not be seen through it the upper lines of the final "y" of the verbs who like "carry" change this "y" in "i" in some of their forms.

The long openings of this same group, which are located following the lines formed by the persons I, you, we, you, they, in the simple form, future tense, indicative mood, active voice; all persons of the simple form, present tense, subjunctive mood, active voice; have in their upper portion a projection which is limited at the left by the parallel 18 and to the right by number 19; said projection being high enough to let see the right and left lines of the final "y" of the verbs that ending in this letter change it into "i" in some of their forms. To the right of the long opening in this group which is following the line formed by the three third persons of the singular of the simple form, present tense, indicative mood, there is a short opening whose left limit is formed by the imaginary parallel 21 and the right limit by the similar line 22; its width is sufficient to let see through it a letter of those which are in the intermediate surface 3 and which will combine with the fundamental word of the present of the verb to the right of which fundamental form of present is that letter, which also will combine with "s" which is at the right of said short opening.

The preterit openings are located following the line formed by those persons who must use the fundamental word of preterit of the verb to be conjugated; its length is limited to the left by the imaginary parallel 23 and to the right by number 24. Its width is the one sufficient to render visible, complete in their height, all letters of any of the fundamental words of preterit of the verbs to be conjugated which are in the intermediate surface 3.

The past participle openings are located continuing the line formed by those persons or persons and auxiliaries or signs that require the use of the fundamental word of the past participle of the verb to be conjugated. Its length is limited to the left by the imaginary line 25 and to the right by line 26, its width being sufficient to render visible complete in their height all letters of any fundamental words of the past participle of the verbs to be conjugated which are on the intermediate surface 3.

The intermediate surface 3 is constituted by a sheet of paper or paste board on which is printed or written the list of the three fundamental forms of the English verbs that are to conjugated, as well as the auxiliary letters. This intermediate surface is located precisely above the matrix plate 1, between the guides 2, and between the said matrix 1 and the selected auxiliary plate 4.

On referring to the intermediate surface 3, it is necessary to explain the appearance in it of the words that are the three fundamental forms of the English verbs as well as the position in which must be placed the auxiliary letters necessary for the conjugation by means of the device of the present invention, being that the location and size of these words and letters with relation to the openings of the auxiliary plates 4, constitute an integral part of the invention. To place the words and letters just mentioned, there is utilized the imaginary lines that on the intermediate surface 3 would project the imaginary parallels numbered from 17 to 26 inclusive; said lines having been numbered in accord with the numeration of said imaginary parallels, in the following way: Imaginary parallel 17 will project on the intermediate surface 3 as the line 17 bis; the parallel 18 will project as the line 18 bis and so forth so that finally the imaginary parallel 26 will project on the intermediate surface 3 as the line 26 bis. The aforesaid projected lines appear in the drawings as dotted lines (Fig. 1).

The present fundamental words of the English verbs have been written as follows: in general, all those words that are not comprised among the following explanations, are written to a height that embraces all the width of the long openings of present and future 8.

Considering new verbs that in taking the gerund termination do not lose their final letter. The present fundamental word of these verbs has been written inside the space marked by lines 17 bis and 19 bis.

Considering new verbs that in taking the gerund ending lose their final letter. The present fundamental word of these verbs has been written in a way that their lost final letter is inside the space comprised between lines 19 bis and 20 bis.

Referring to verbs that add "es" for their third persons singular of the simple form, present tense, indicative mood, active voice. In the same line with the fundamental word of present of these verbs an "e" has been written of a suitable size that can be seen through the short opening of present opening 9, and located in the space comprised between lines 21 bis and 22 bis.

Referring to verbs that in taking the gerund ending duplicate their final consonant. There are also to be borne in mind the requirements for the verbs referred to that do not lose their final letter in taking the gerund ending. In the same line with the fundamental word of present form of these verbs there is written the duplicate of their final letter, of the proper size to be seen through the short openings of gerund 7, and located in the space comprised between lines 20 bis and 21 bis.

The verbs that end in "y" change this letter into "i" and add "es" in the three third persons of the singular of the simple form, present tense, indicative mood, active voice. Provisions have been kept in mind to meet the requirements expressed for the verbs which add "es." Care has been taken that the final "y" is located inside the space comprised between imaginary lines 18 bis and 19 bis; the right and left lines of this "y" define the point where the normal height of the balance of the letters which form the fundamental words of the present of the verb referred to, end; and terminate at a sufficient height so that any letter is not out of proportion.

Verbs ending in "e" preceded by "i", in passing to gerund change that "e" into "y" and lose the "e." There have been taken into consideration the expressed requirements of the fundamental word of present of the verbs which in passing into gerund loses the final letter. On the "i" of these verbs there are arranged two lines which will make it appear like "y" through the long openings of gerund 6; said "i" must be in the space comprised between lines 17 bis and 18 bis. The lines put on the "i" start at the normal height where the balance of the letters of the fundamental word of present of these verbs end; they finish at a suitable height to provide the converted "y".

The preterit fundamental words of the English verbs to be conjugated with this device, are written in the space marked by the imaginary parallels 23 bis and 24 bis, their height been such that it almost fills the width of the preterit openings 10.

The past participle fundamental words of the English verbs to be conjugated in the device according to the present invention, are represented in the space marked by the imaginary parallels 25 bis and 26 bis; their height is such that they must fill the width of the openings 11 of the past participle.

Having thus described the invention, what I consider as new and desire to secure by Letters Patent is:

1. A device for mechanizing the conjugation of the English verbs which comprises a matrix plate of a suitable stiffness provided with edge guides; auxiliary plates movable in said guides and provided with openings arranged to register with words or parts of verbs to be conjugated and printed on an independent sheet of material to conjugate, which changes and accidents are in the intermediate surface, can be read through the openings of the auxiliary plates; in said auxiliary plates there is indicated, in the upper part, each one of the verbal moods that can be conjugated with each one of the auxiliary plates as well as the mood and whether it is active or passive voice; to the left of each one of these plates there is arranged in lines separated by blank spaces the persons, auxiliary verbs and corresponding signs to each form of each one of the different verbal tenses and moods, expressing each tense and form of the form and tense referred to, having arranged each form of the verbal persons in groups, and reading also through said openings the different tenses of the verb to be conjugated; and with an intermediate surface constituted by a sheet of paper or any other suitable material in which the list of the three fundamental forms of the English verbs to be conjugated are hand written or printed; as well as auxiliary letters in combination with the auxiliary plates, completing the changes and accidents of the conjugation, said intermediate surface located to that end between the matrix-plate and the auxiliary plate used.

2. A device of the described character as specified in claim 1 in which the openings in the auxiliary plates are long and short perforations, respective openings for the simple form of present and future, preterit, past participle; said openings being in close relation with the location and sizes of the words and letters in the intermediate surface in regard to changes and accidents of the verb to be conjugated and with the fundamental forms of the English verbs and auxiliary letters for the conjugation.

JOSÉ NIETO GONZÁLEZ.